(12) United States Patent
Salvo et al.

(10) Patent No.: US 12,241,512 B2
(45) Date of Patent: Mar. 4, 2025

(54) FLEXIBLE DUST BOOT FOR AUTOMOTIVE BRAKE CYLINDER

(71) Applicant: Continental Teves AG & Co. OHG, Frankfurt am Main (DE)

(72) Inventors: Andrea Salvo, Ligurien (IT); Libero Magini, Ligurien (IT)

(73) Assignee: Continental Automotive Technologies GmbH, Hannover (DE)

( * ) Notice: Subject to any disclaimer, the term of this patent is extended or adjusted under 35 U.S.C. 154(b) by 262 days.

(21) Appl. No.: 17/216,217

(22) Filed: Mar. 29, 2021

(65) Prior Publication Data

US 2021/0324927 A1 Oct. 21, 2021

Related U.S. Application Data

(63) Continuation of application No. PCT/EP2018/076450, filed on Sep. 28, 2018.

(51) Int. Cl.
*F16J 3/04* (2006.01)
*F16D 65/00* (2006.01)
*F16D 125/08* (2012.01)

(52) U.S. Cl.
CPC .......... *F16D 65/0087* (2013.01); *F16J 3/046* (2013.01); *F16D 2125/08* (2013.01)

(58) Field of Classification Search
CPC .... F16D 3/84; F16D 65/0087; F16D 2125/08; F16J 3/04; F16J 3/046; F16J 15/52
See application file for complete search history.

(56) References Cited

U.S. PATENT DOCUMENTS

| 3,187,848 | A |  | 6/1965 | Shellhause et al. |
| 3,490,343 | A | * | 1/1970 | Afanador ................ F16D 65/18 74/18.2 |
| 4,506,768 | A | * | 3/1985 | Innocent ................. F16D 65/84 277/634 |
| 6,179,717 | B1 | * | 1/2001 | Schwarzler .............. F16J 3/046 464/175 |

(Continued)

FOREIGN PATENT DOCUMENTS

| CN | 2490034 | 5/2002 |
| CN | 2794949 Y | 7/2006 |

(Continued)

OTHER PUBLICATIONS

Korean Written Opinion dated Aug. 31, 2022 for the counterpart Korean Patent Application No. 10-2021-7005399.

(Continued)

*Primary Examiner* — Thomas W Irvin

(57) ABSTRACT

A dust boot sealing system for automotive brake cylinders, is arranged for dust protection between a linear actuation member and a housing of the brake cylinder. The boot comprises flexible bellows between two concentrical interface portions, and the both interface portions rest radially outwards from their respective counterpart seats in circumferential grooves on housing and actuation member. The boot is provided with pressure relief valve and with integrated pressure relief valve function which automatically and temporarily changes into open status under a pressure gradient decline in direction from interior to exterior, with respect to the boot.

13 Claims, 8 Drawing Sheets

(56) References Cited

U.S. PATENT DOCUMENTS

| | | | |
|---|---|---|---|
| 6,308,959 B1 | 10/2001 | Sokolihs et al. | |
| 6,609,593 B2* | 8/2003 | Ishii | F16D 55/22655 188/73.44 |
| 6,820,876 B2* | 11/2004 | Iwano | F16J 3/845 277/552 |
| 7,097,004 B2* | 8/2006 | Barrett | F16J 3/046 188/73.1 |
| 7,677,982 B2* | 3/2010 | Compau | F16J 3/046 277/928 |
| 7,708,121 B1 | 5/2010 | Morais et al. | |
| 8,857,576 B2* | 10/2014 | Kobayashi | F16D 55/2265 188/73.44 |
| 8,925,691 B2* | 1/2015 | Gruber | F16J 3/043 188/73.1 |
| 9,863,490 B2* | 1/2018 | Gaye | F16D 55/227 |
| 10,030,778 B2* | 7/2018 | Hermanski | F16J 15/52 |
| 10,550,894 B2* | 2/2020 | Takabe | F16J 3/04 |
| 10,823,239 B2* | 11/2020 | Jung | F16D 51/30 |
| 2002/0050428 A1* | 5/2002 | Ishii | F16D 55/22655 188/71.1 |
| 2003/0141670 A1 | 7/2003 | Heinlein | |
| 2004/0007832 A1* | 1/2004 | Iwano | F16J 3/046 277/635 |
| 2004/0026194 A1 | 2/2004 | Cortinovis | |
| 2004/0188191 A1* | 9/2004 | Lintner | F16J 3/048 188/73.45 |
| 2008/0070706 A1* | 3/2008 | Compau | F16D 3/845 464/145 |
| 2009/0056532 A1 | 3/2009 | Lind et al. | |
| 2011/0186389 A1* | 8/2011 | Gruber | F16J 3/046 188/219.1 |
| 2013/0068576 A1* | 3/2013 | Ko | F16D 51/22 188/327 |
| 2013/0161134 A1* | 6/2013 | Kobayashi | F16D 55/2265 188/73.44 |
| 2014/0110906 A1 | 4/2014 | Champion et al. | |
| 2016/0040785 A1* | 2/2016 | Hermanski | F16J 3/042 277/635 |
| 2016/0186827 A1 | 6/2016 | Jungmann et al. | |
| 2016/0290420 A1* | 10/2016 | Gaye | F16D 65/0006 |
| 2016/0377135 A1 | 12/2016 | Ziskovsky et al. | |
| 2017/0307084 A1 | 10/2017 | Atschreiter et al. | |
| 2018/0031047 A1* | 2/2018 | Takabe | F16J 3/04 |
| 2019/0128346 A1* | 5/2019 | Jung | F16D 51/24 |
| 2022/0018406 A1* | 1/2022 | Kim | F16D 55/22655 |

FOREIGN PATENT DOCUMENTS

| | | |
|---|---|---|
| CN | 101400555 A | 4/2009 |
| CN | 102425630 A | 4/2012 |
| CN | 102562868 A | 7/2012 |
| CN | 103671645 A | 3/2014 |
| CN | 104245452 A | 12/2014 |
| CN | 105531494 A | 4/2016 |
| CN | 106274465 A | 1/2017 |
| DE | 3111576 A1 | 3/1982 |
| DE | 3241548 A1 | 5/1984 |
| DE | 4037414 A1 | 5/1992 |
| DE | 102013103977 A1 | 11/2014 |
| DE | 102014219460 A1 | 3/2016 |
| EP | 1441140 A1 | 7/2004 |
| EP | 2610519 B1 | 7/2013 |
| FR | 2973462 A1 | 10/2012 |
| GB | 883894 A | 12/1961 |
| GB | 958450 A | 5/1964 |
| GB | 2086544 A | 5/1982 |
| GB | 2261267 A | 5/1993 |
| JP | H11201201 A | 7/1999 |
| JP | 2002070899 A | 3/2002 |
| JP | 5124072 B2 | 1/2013 |
| KR | 19990032383 | 7/1999 |
| WO | 99/00617 A1 | 1/1999 |
| WO | 02/44580 A1 | 6/2002 |
| WO | 2010/009884 A1 | 1/2010 |

OTHER PUBLICATIONS

Decision to Grant a Patent dated Oct. 11, 2022 for the counterpart Japanese Patent Application No. 2021-511567.
Brazilian Office Action dated Oct. 4, 2022 for the couterpart Brazilian Patent Application BR112021003817-5.
First Office Action dated Apr. 25, 2022 (Translated) from corresponding Chinese patent application No. 201880098237.4.
First Office Action dated Apr. 25, 2022 (Original) from corresponding Chinese patent application No. 201880098237.4.
Search Report dated Apr. 19, 2022 from corresponding Chinese patent application No. 201880098237.4.
International Search Report and Written Opinion dated May 27, 2019 from corresponding International Patent Application No. PCT/EP2018/076450.
Chinese Second Office Action dated Dec. 28, 2022 for the counterpart Chinese Patent Application No. 201880098237.4.
European Examination Report dated Apr. 4, 2023 for the counterpart European Patent Application No. 18 785 869.1.
Chinese Notice of Allowance dated May 31, 2023 for the counterpart Chinese Application No. 201880098237.4 and DeepL translation of same.
Korean Office Action dated Aug. 25, 2023 for the counterpart Korean Patent Application No. 10-2021-7005399 and DeepL translation of same.
European Communication Under Rule 71(3) Intention to Grant dated Jul. 17, 2024 for the counterpart European Patent Application No. 18 785 869.1.

* cited by examiner

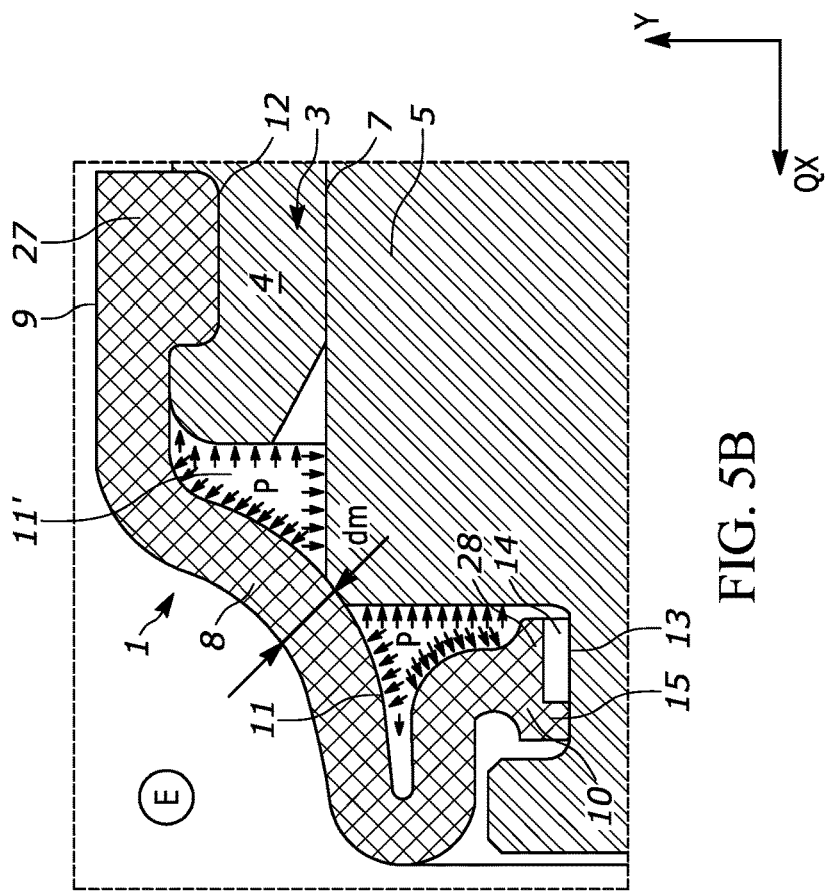
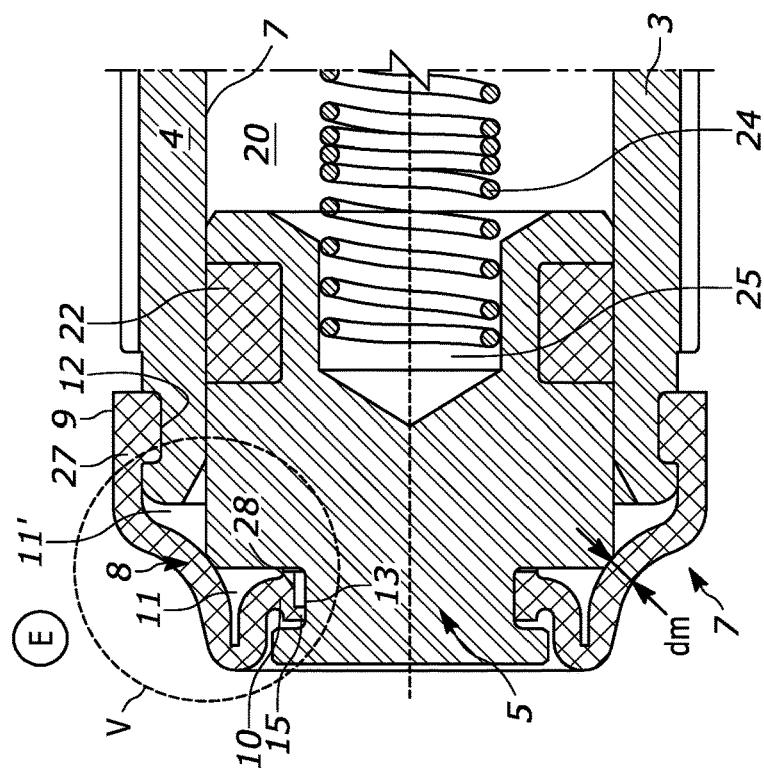
FIG. 5B
FIG. 5A

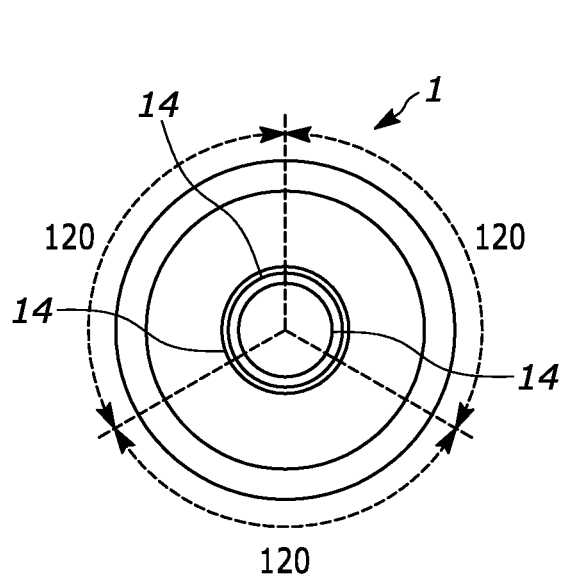
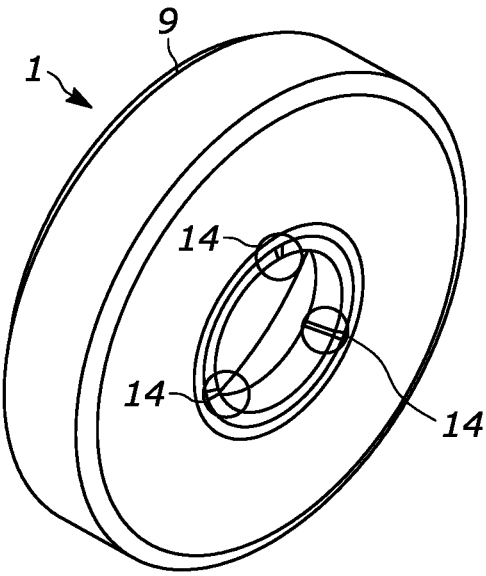
FIG. 6A   FIG. 6B
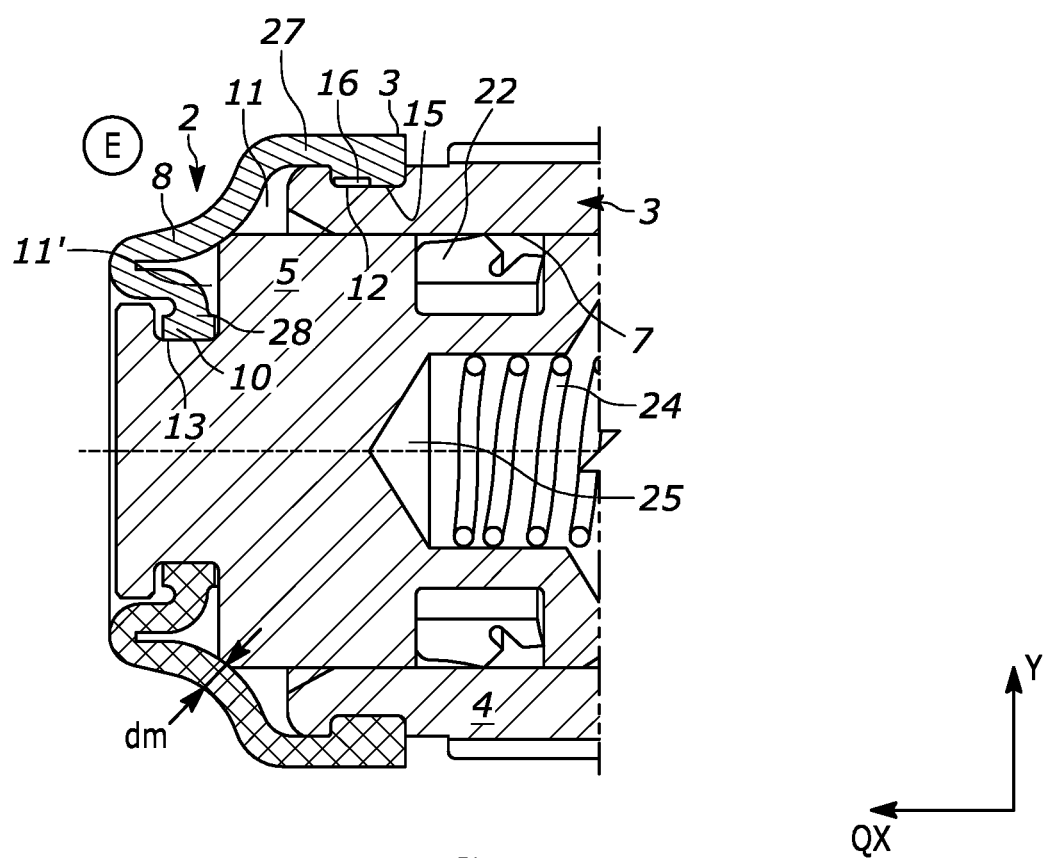
FIG. 7

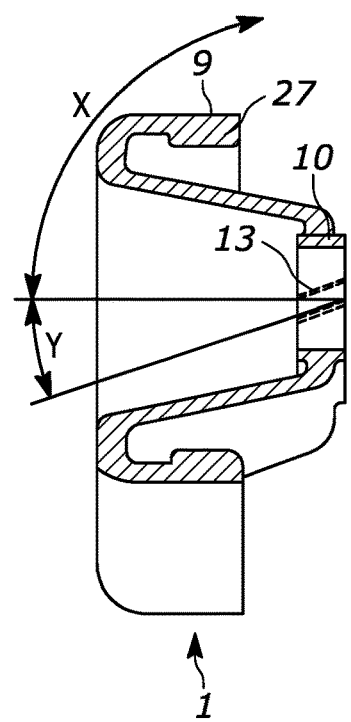
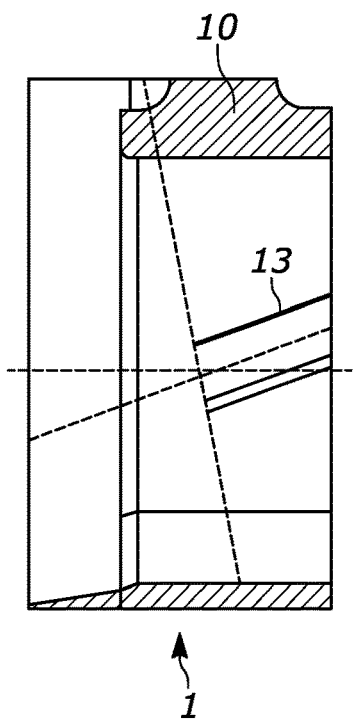
FIG. 11A
FIG. 11B
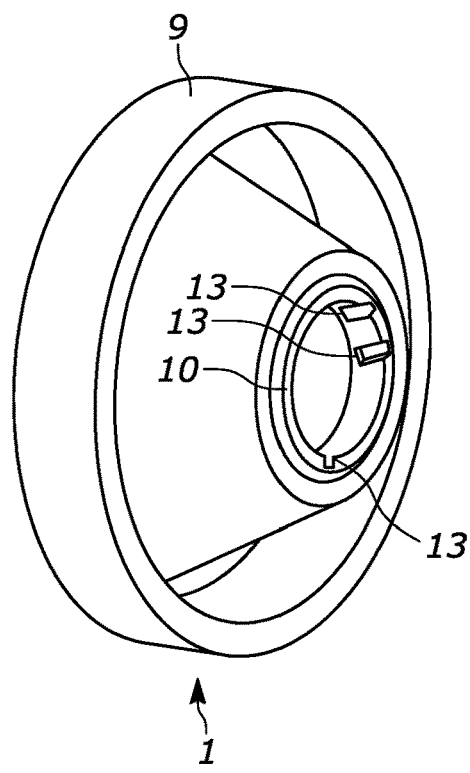
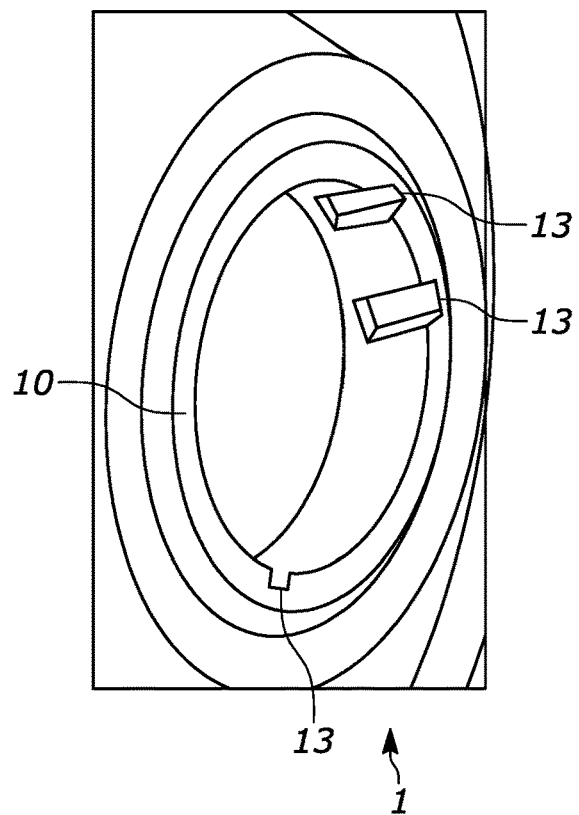
FIG. 12A
FIG. 12B

FLEXIBLE DUST BOOT FOR AUTOMOTIVE BRAKE CYLINDER

CROSS REFERENCE TO RELATED APPLICATIONS

This U.S. patent application claims the benefit of PCT patent application No. PCT/EP2018/076450, filed Sep. 28, 2018, which is hereby incorporated by reference.

TECHNICAL FIELD

The present invention relates to a resilient boot sealing system for an automotive wheel brake actuation cylinder.

BACKGROUND

Such wheel brake cylinders are generally affixed with a stator and may be embodied as hydraulic, electric or mechanic actuator including a relatively movable actuation member for initiating spread operation between brake pads, such as brake shoes.

Conventional drum brakes for vehicles are widely known and often comprise a hydraulic wheel brake cylinder with a housing, hydraulic pressure chamber and two hydraulically actuated diametrically working pistons. The pistons are the responsible actuation members for spreading the brake shoes. Each piston performs in form of a displaceable wall that limits the hydraulic fluid volume capacity in the pressure chamber of the housing.

The hydraulic pistons spread between the two brake shoes under hydraulic pressure when the drum brake system is applied, i.e. when operator performs brake actuation or whenever the brake system is automatically applied. A parking brake function mode may operate the same cylinder together with added self-locking means. Consequently, the brake shoes are urged into frictional contact with the sliding surface of the rotating brake drum. Pretensioned return springs serve for return/retention of the brake shoes including the pistons when the drum brake is released.

Irrespective of brake type or cylinder type (electric, hydraulic, mechanic) any relative displacement between housing and actuation member requires a gap in-between. That gap requires a sealing system which includes a flexible boot. The flexible boot comprises interfaces at either end with bellows arranged therebetween so that ingress of foreign substance is avoided.

A general problem with respect to those cylinders is their durability resistance against corrosion. That task is not easy to achieve because wheel cylinders are mostly located in relatively low-level niches which means that the cylinders are placed in an area which is exposed to weather and dirt. Good protection against contamination with foreign substance, such as dirt, fluid, gravel or mixtures thereof is key. A conventional dust boot is an example for regular components of conventional wheel cylinders on hydraulic drum brakes, electric parking brakes and combined brakes. Such boot is responsible to prevent dust entrance to the wheel cylinder interior. The boot prevents damage concerning movement between actuation members (mostly a hydraulic sealed piston) and a cylinder. A defective boot may allow contamination of hydraulic brake fluid or risk that brake fluid leaks and spoils the exterior.

High pressure spray cleaning systems may also be of significant danger due to possible ingress of cleaning fluids. While most known hermetically closed cylinder sealing systems fulfil the major sealing requirements sufficiently, at least as far as protection against ingress of foreign substance is concerned. However, some new test results show possible drawbacks, especially under service brake applications, including deficits under high temperature use in connection with air or gas that may be enclosed in a chamber under the bellows of the boot. Under exposure to exhaustive brake operation and/or extreme environmental conditions and/or limited cooling the temperature in the interior of a drum brake wheel cylinder can increase above 120° C. Such increase of temperature together with conventional hermetically closed boots may lead to an increase of internal pressure in the chamber formed between the boot, actuation member (piston) and housing. With increasing of the temperature (pressure) in the interior of the chamber, conventional boot expands in balloon-like manner due to the thermal expansion. Such additional stress may either promote the boot interfaces flipping out of their seat or alternatively may cause fatal error due to rupture of the elastomere boot. The both rupture and flipping result in handicapped sealing functions.

In improving sealing JP 3938236 B2 discloses a drum brake cable actuation interface member with a sealing system including a boot that comprises two interface sections that are each mounted radially outwards (centered radially outwardly) on periphery and wherein one of the interface sections is perforated. The flexible boot has bellows between the interface sections and allows relative displacement between actuation member and housing. Brake cable linkage may be introduced from a backside of the housing. The interface section integrates a tiny through-hole orifice, which provides constant pressure equalization between internal and external of the boot. Consequently, such hermetically open boot design lessens uncontrolled flipping action. For this reason an extra supplemental shielding wall is suggested, which is arranged on the radially outer housing interface portion of the boot, for extra protection against ingress of rainwater or spray water e.g. washing fluids.

U.S. Pat. No. 3,187,848 discloses heat resistive and also robust mounting improvement for drum brake wheel cylinders together with a housing having a cylinder bore provided therein, a piston operable in said bore and forming therewith fluid pressure chamber. One end of said housing adjacent said cylinder having a cylindrical recess formed therein of larger length and diameter than said cylinder bore whereby a protective shoulder is provided. The annular inner surface of said recess having a predetermined controlled micro finish of greater roughness than said cylinder bore. A link pin in engagement with said piston and extending through and beyond said cylinder for actuation of a brake shoe, so that an annular wheel, cylinder boot is integrated in the housing. The packaging, especially the length of the assembly, is improvable and test programs reveal weakness with respect to protection against contamination, especially weakness in protection against ingress of fluids like rainwater, pressurized spray washing water or weakness in passing salt-spray-corrosion-tests. That weakness appears in connection with uncontrolled flipping of the boot.

An improved sealing system with optimized thermal design is therefore desired. Further, improvement in protection against ingress of foreign substance, e.g. fluid which means inhibit internal corrosion, especially which avoids risk for ingress of substance when flipping action occurs is also desired.

SUMMARY

A sealing system comprises a boot which at least partially encloses a sealed chamber and a normally closed pressure relief valve. The pressure relief valve automatically and temporarily changes in a controlled, limited and reversible manner into open position for pressure relief when pressure is not equal between the interior, i.e. the sealed chamber, and exterior. The pressure balance is thus maintained and such balance avoids or limits boot deformation and consequently flipping of the boot. Thus, dust boot removal from cylinders exterior housing seat is reduced.

The pressure relief valve mode may be automatic and, self-driven, and without supply of external energy, e.g. current-less while still operating in a predetermined, controlled matter.

The pressure relief means of the sealing system integrates relief valve spring elasticity wherein the relief valve elasticity which is integrated in the elastomere, flexible dust boot, and that peripheral interface of the dust boot, integrates relief valve body means, so that a part of the radially grooved counterpart seat of housing and/or actuating member/piston integrates a relief valve seat of the respective relief valve.

In more detail, the pressure relief valve body in the interface section of the boot may be configured as a separate recessed portion of the boot. The recessed portion is connected with the interior of the boot but separated from the exterior. Consequently, the periphery of the boot, and thus the interface with the cylinder may be unchanged. With a common interface a boot incorporating a pressure relief valve as described herein will allow change of the boot during maintenance for conventional cylinders (including their periphery.

Further, a tooling of the boot may be simplified, when the boot includes a recessed portion in its interface section. The recessed portion may be a longitudinal slot section which is arranged in parallel with the linear displacement direction of the actuation member. Another alternative embodiment may include a recessed portion integrated in its interface section, that may be a longitudinal, slot section comprising antiparallel slot design with walls that can be inclined or curved with respect to a central axis of linear displacement.

Elasticity in valve function may be varied by change of thickness of an orthogonally arranged end wall/diaphragm. The end wall/diaphragm is provided with a specific, given resilience, and that the resilience of the end wall corresponds with the necessary elasticity of the relief valve means. Consequently, the end wall may be designed with reduced wall thickness in compare with an average wall thickness of the boot.

The relief valve may have an interface portion integrating multiple recessed portions and/or slot sections. The pressure relief valve means may also be integrated only on the first interface portion, or integrated only on the second interface portion or alternatively integrated on both interface portions. Further adaption is possible, when multiple slot sections and/or interface portions are regularly arranged, especially under equivalent distance and with equivalent angle to each neighbor on the boot. It is further beneficial when pressure relief valve means are integrated in all interface sections of a boot.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

FIG. 5a is a schematic sectional side view of the cylinder and boot, FIG. 5b is an enlarged, transverse, sectional detail view concerning cylinder and boot details as marked V in FIG. 5a, FIG. 6a is an enlarged front view of the boot with integrated slots in its second, radial inner, interface area, FIG. 6b is an isometric view of the boot with integrated slots in its second, radial inner, interface area, FIG. 7 is an enlarged, transverse, sectional view concerning cylinder and boot details as marked V in FIG. 2 concerning the second boot embodiment, FIG. 11a is a further variation in embodiments comprising antiparallel (inclined) slot, FIG. 11b is a further variation of FIG. 11a in sectional view, FIG. 12a is a further variation in embodiments comprising irregular positioned slots, and FIG. 12b is the further variation of FIG. 11b in sectional view.

DETAILED DESCRIPTION

Figure 1:
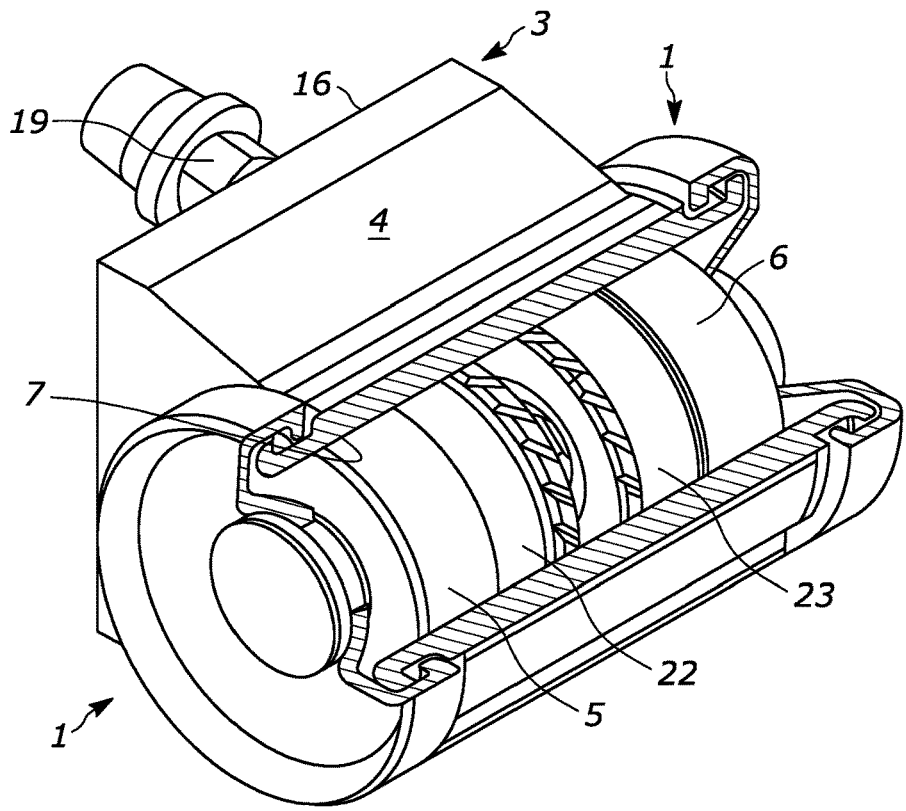
FIG. 1 is an isometric sectional view depicting a first embodiment of a hydraulic wheel cylinder with sealing means when actuation members are fully retracted.

Although a broad variety of other applications in other brake system arrangements and applications remain still possible, the invention is explained in more detail with focus on one example concerning boot embodiments 1,2 as applicable in a drum brake wheel cylinder arrangement, which is explained in more detail in the following detailed description of the drawing.

A drum brake system according to the present invention may principally be designed in simplex, duplex, duo-servo or other constructive mechanical configuration. A drum brake system according to the invention may generally be operated in different functions according to very different functional modes e.g. in service brake mode and/or in self-locking parking brake mode, and/or in emergency brake mode in redundancy to a service brake system.

A drum brake system comprises two opposed brake shoes that are expandable relative to one another. The brake shoes may frictionally cooperate in brake actuation with the circumferential friction surface of a rotatable brake drum that stands in association with a rotatable vehicle wheel (not shown). A wheel cylinder 3 is configured as a linear drive device, e.g. an expander that may include hydraulic, mechanic and/or electromechanical subsystems e.g. an electromotive actuator with drive train e.g. gears in stages and/or rotation-to-translation exchange, together with other suitable brake periphery e.g. drum brake linkage means. Each cylinder 3 comprises at least single or opposed displaceable actuation members 5,6.

The cylinder 3 is generally rotationally fixed to a drum brake stator which may be designed in typical anchor plate shape or alternatively designed as an axle component. In the first embodiment the cylinder 3 may be designed as a hollow solid body arranged with mechanical interface with comprising the mounting socket 16 and integrated internal thread 17 for externally threaded mounting means such as screws. In case of electric and/or hydraulic drive means configuration each cylinder is arranged with electric and/or hydraulic port means 14 that may be designed as interface connector e.g. internal thread, bleeding valve means 19 in the vertically uppermost portion of a hydraulic chamber 20. The hydraulic chamber 20 stands in permanent hydraulic connection with the hydraulic port 18, longitudinal cylinder bore 21 and also with two opposed hydraulic action member pistons that are allocated for sealed axial relative displacement within the cylinder bore. Each actuation member piston carries its own sliding lip seal member 22,23. Finally a compression spring member 24 may be allocated interposed in axially between the two actuation member pistons so that both pistons are generally and flexibly spread apart from each other for safeguarding the nominal hydraulic chamber volume when the brake system remains driveless under brake release condition. The ends of the compression spring member 24 may be allocated in opposed blind bores 25,26 of the both actuation member pistons.

The cylinder comprises an annular flexible ring shape sealing boot 1,2 that integrates at its first end a housing interface 9 including a radially inwardly directed flange 27 which is elastically snapped and thereby sealingly allocated in a radially lowered position from radially outwardly into a radial groove of a seat 12 that is arranged on the outer surface of the expander housing 4. A second end of the ring shape sealing boot 1,2 is configured with a member interface 10 including a radially inwardly directed flange 28 that is elastically snapped and thereby sealingly allocated in a radially lowered position from radially outwardly into a groove of a seat 13 that is arranged on an outer surface of the actuating member (piston) 5,6. Consequently the both seats 12,13 and interface portions 9,10 form an overlapping, lowered, meander-shape mechanical interacting sealing system for improved mechanical spray water resistance, which is additive to flexible, elastomers sealing means/functions that are integrated in each flange 27,28 of the boot 1,2. Consequently the described sealing system provides the generally hermetical (dustproof, liquid-tight, gastight) sealing function between interior (e.g. "dry" chamber 11,11') and exterior E.

An interface 9,10 of the boot additionally comprises normally closed pressure relief valve means and implicit pressure relief valve function which means that the valve body automatically and temporarily changes in predetermined position into open status under a pressure gradient decline in direction from interior of chamber 11,11' to exterior E with respect to the chamber 11,11' which is separated inbetween boot 1,2 and housing 4. Consequently, the sealing system allows predetermined, controlled and by this way also limited, directed, overpressure release e.g. gas blow out from the chamber 11,11' into the exterior E. In more detail a very specially designed section of the boots flanges 27,28 manages directed blow out when integrating additional feature and function, as its valve body is temporarily allowed to be temporarily lifted above its opposed valve seat nutground section. The process is ended when the boot integrated elastomere check valve function terminates as it closes under equal pressure between chamber 11,11' interior and exterior E. With other words the boots 1,2 "valve body" flange portion automatically returns after pressure release into its sealed normally closed sealing position with respect to the seat 12,13 in the nutground section. All that function is performed automatically with elastomere elasticity of the inventive boot 1,2 only under the influence of a pressure gradient. Consequently, the pressure release is self-motivated, without supply of external energy, e.g. non-electric operation.

In one embodiment the pressure relief valve body, i.e. the flange portion, of the boot integrates a separate recessed slot/channel shape section 14. The recessed portion 14 may be connected with internal chamber 11,11' and also sealingly separated from exterior E by flexible, thinned diaphragm/end wall 15. The radially inner, integrated, recessed, portion 14 in the flange 27,28 may be a longitudinal slot section which is arranged in parallel with the axial, linear displacement direction of the actuation member 5,6 and wherein each diaphragm is arranged as a flexible end wall 15 that is arranged generally orthogonal with respect to the axial axis of displacement. Each end wall 15 is provided with a specific, predetermined resilience, and that the resilience of the diaphragm/end wall 15 corresponds with the necessary elasticity with respect of the pressure differential control. The end wall/diaphragm 15 may be designed with reduced wall thickness in compare with an average wall thickness dm of the boot 1,2.

An interface section 9,10 of a boot 1,2 may comprise multiple pressure relief valve sections, which means that one interface portion 9,10 may integrate multiple recessed portions 14 and/or slot sections. In this case the multiple valve body portions/slot sections 14 may be regularly arranged, and they may be equidistant about the circumferential direction. The sections 14 may also be arranged with equal angle to each, other/neighboring slot. The behaviour of the valve function may be influenced by the overall number of the slots, the area/size of the slots, and the elasticity of their diaphragm/end wall 15. One skilled in the art would be able to determine a pressure relief function and the number, and size of slots to perform such function for a particular design of the boot 1,2.

FIGS. 11 and 12 concentrate on further detail variations with respect to a boot 1 that are disclosed in example in connection with the first embodiment of the boot 1.

More specifically FIG. 11a,b show antiparallel slot 13 design, i.e. parallel and in opposing direction, comprising inclined slot orientation with regard to the central axis of displacement.

FIG. 12a,b disclose irregular applications of the inclined slot 13 design modification. The disclosed features described in the examples, embodiments and modifications herein may be combined in variety, also in connection with the boot 2 embodiment.

Figure 2:
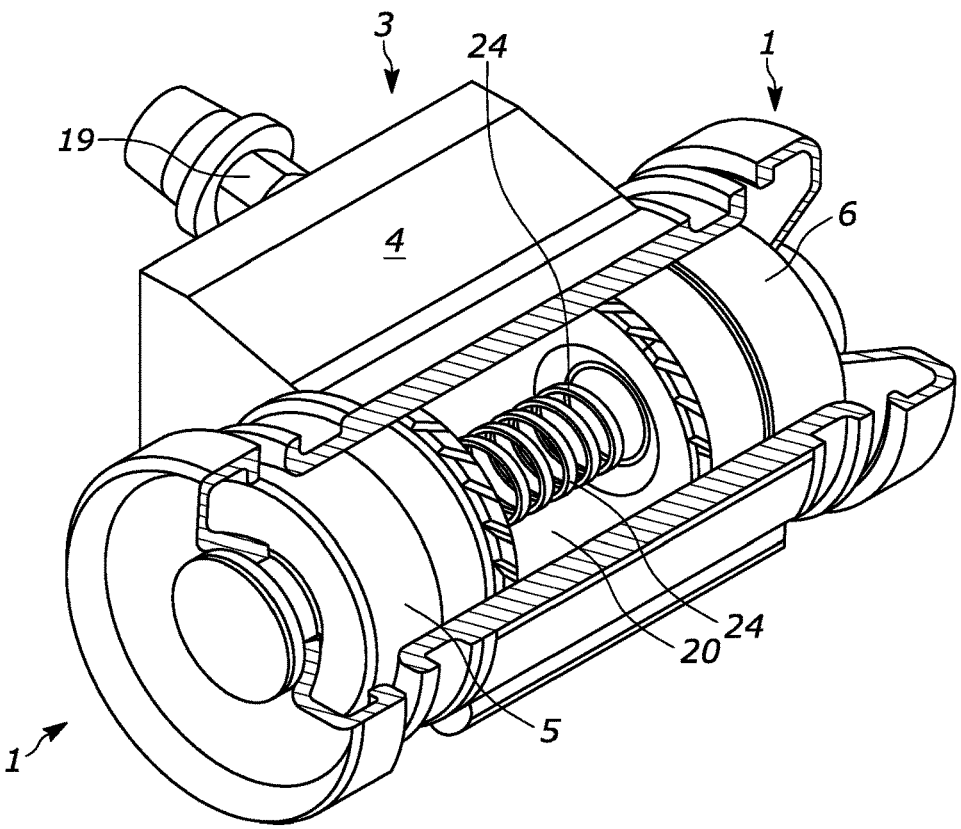
FIG. 2 shows the same cylinder as in FIG. 1 with expanded compression spring between the both actuation members.
Figure 3:
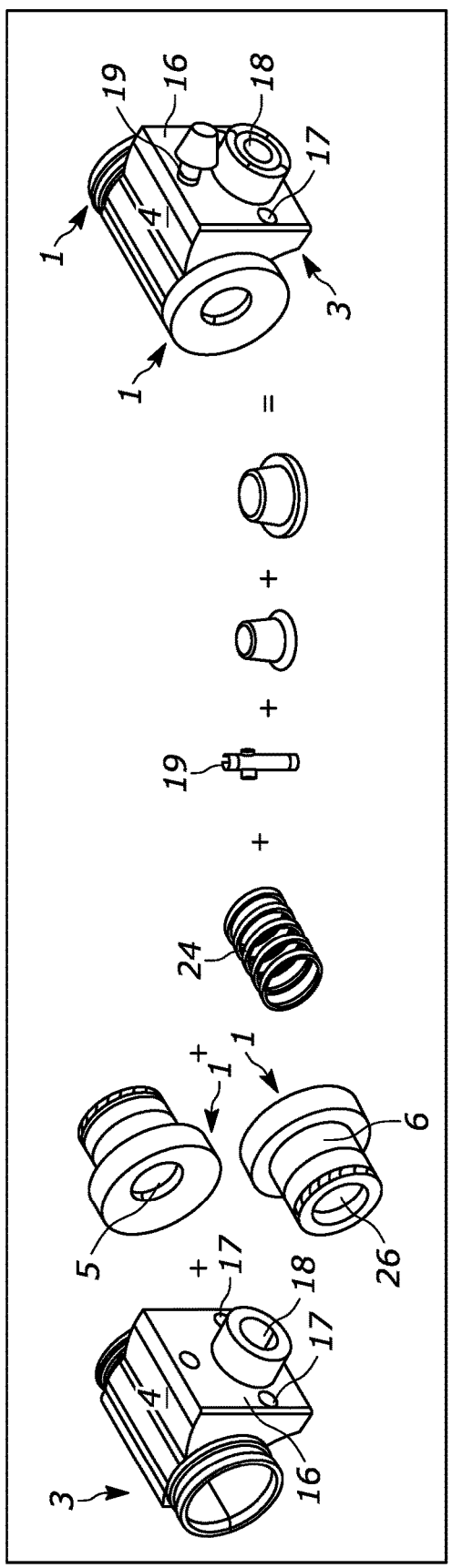
FIG. 3 is an exploded isometric view of the cylinder components.
Figure 4:
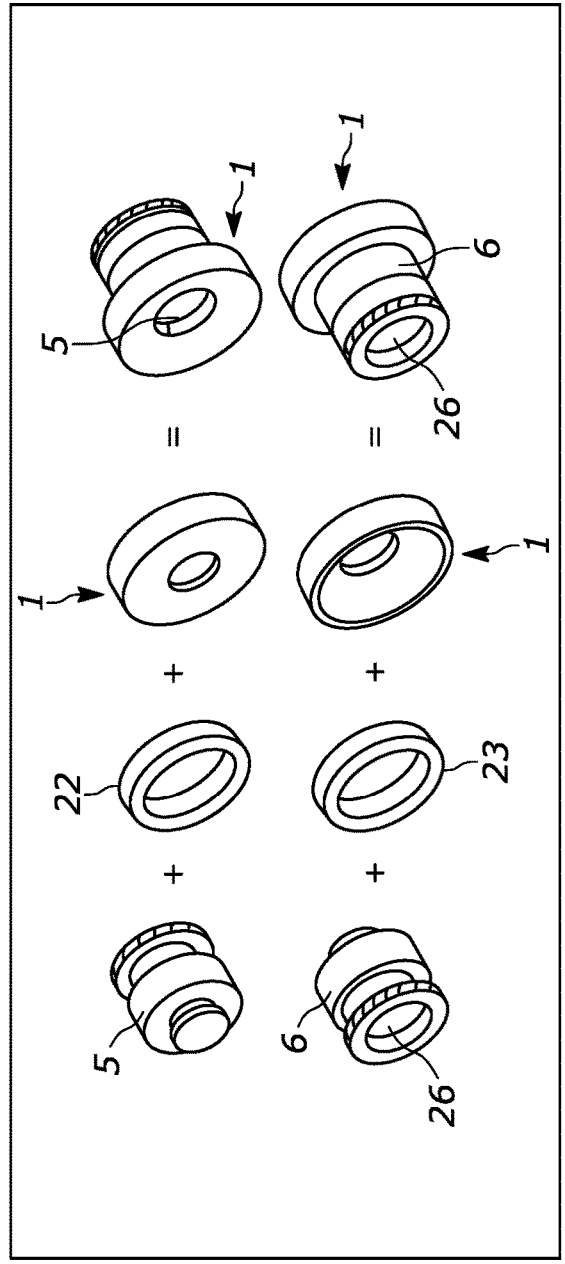
FIG. 4 is an exploded isometric view of parts that form the both actuation members of the cylinder in FIG. 1.
Figure 8A:
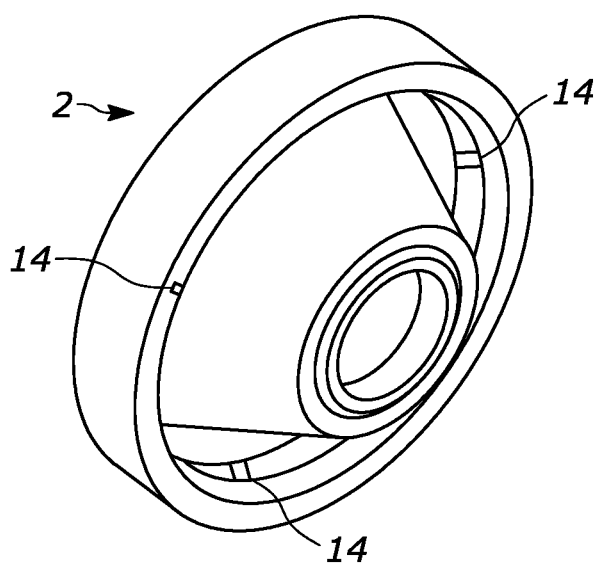
FIG. 8a is an enlarged front view of the boot embodiment in FIG. 7 comprising integrated slots in its first interface area.
Figure 8B:
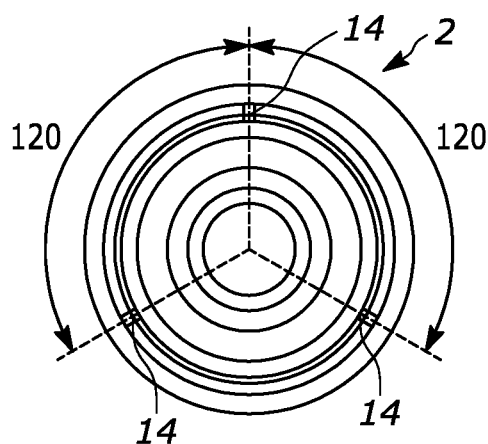
FIG. 8b is an isometric view of the boot embodiment in FIG. 7 comprising integrated slots in its first interface area (second boot embodiment), FIGS. 9 and 10 compare both cylinder embodiments in isometric sectional view and their respective boot embodiments in isometric view.
Figure 9:
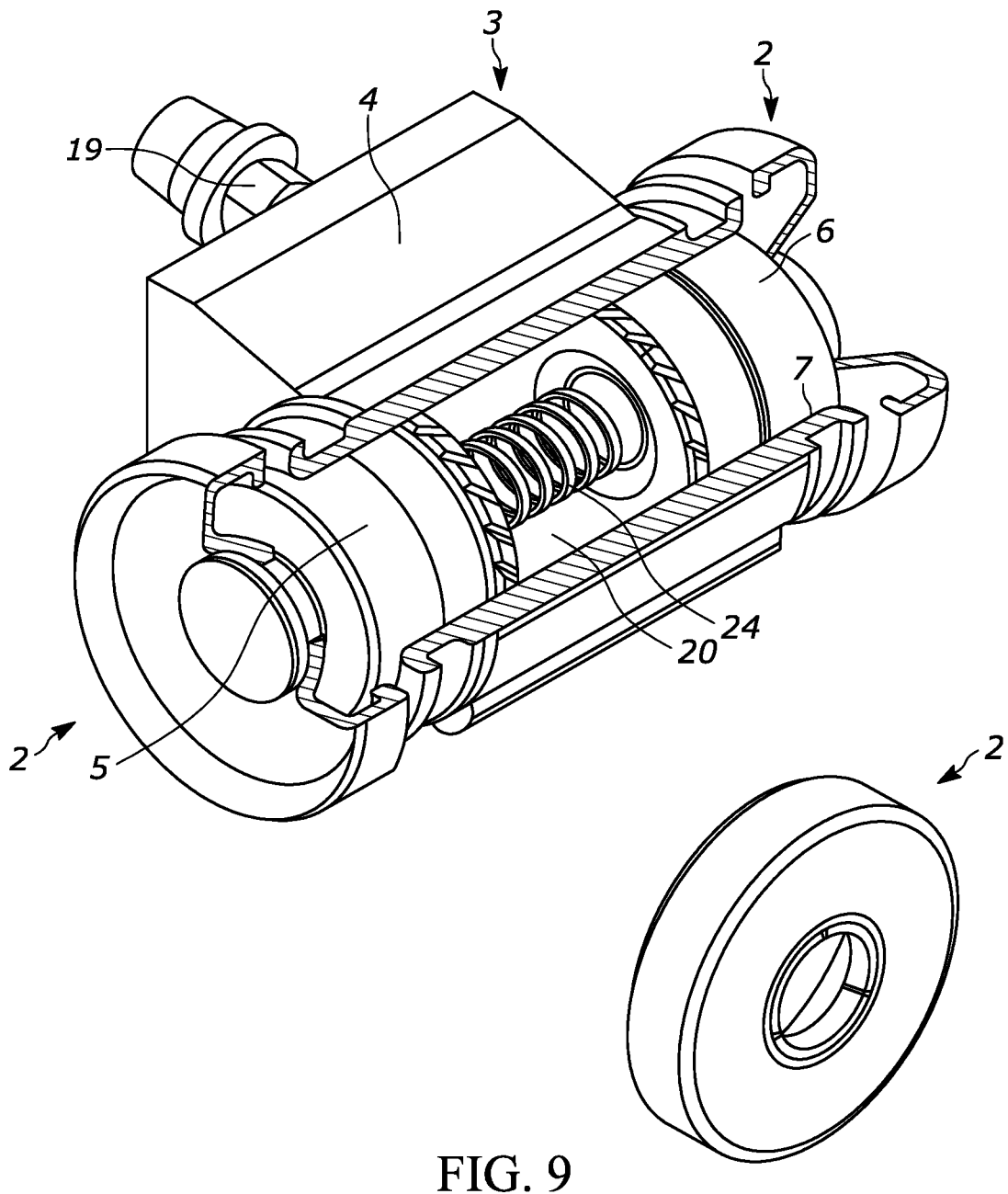
Figure 10:
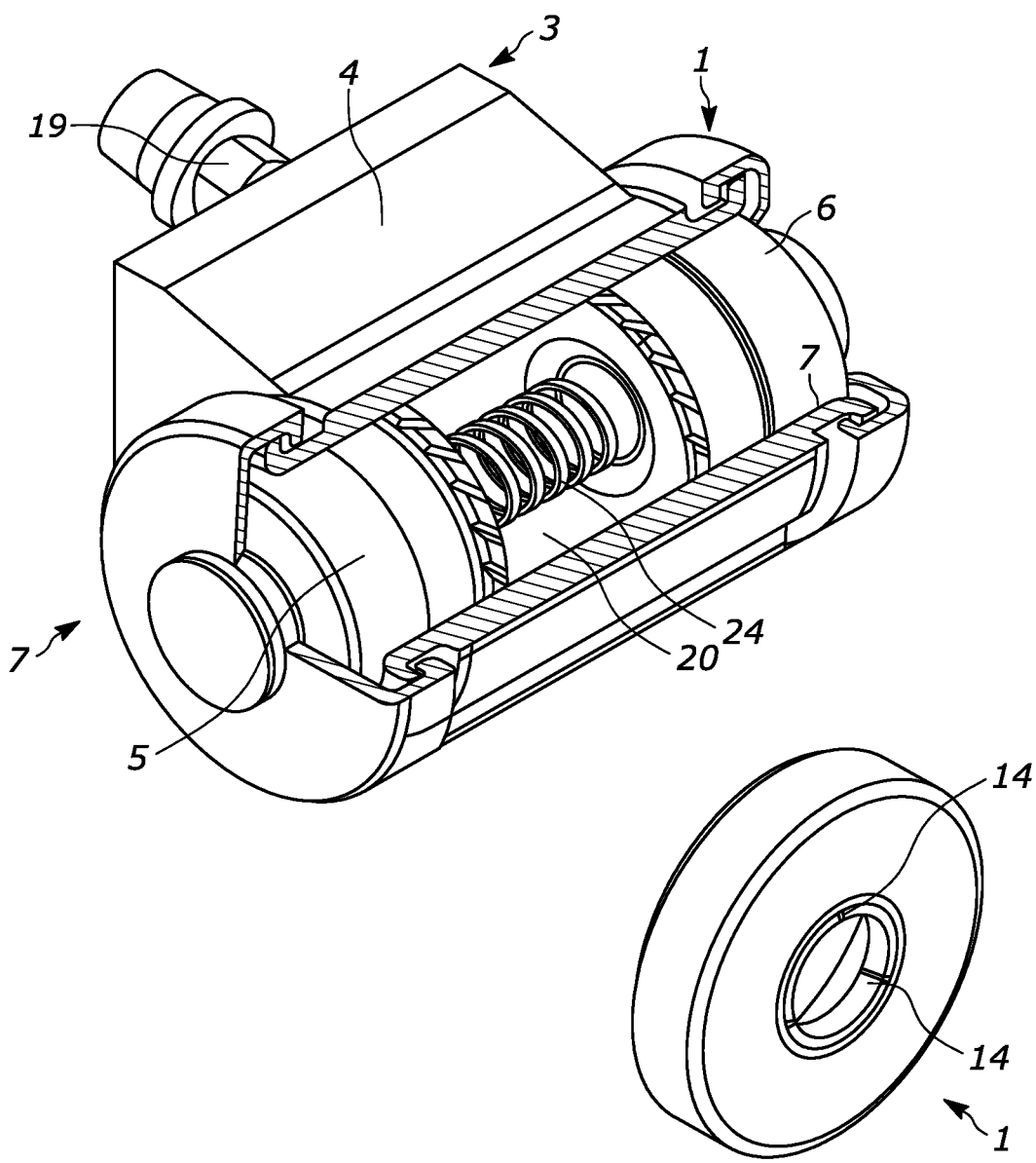

Still further various modifications, alternatives and embodiments of the disclosed features remain possible. Consequently the pressure relief valve means may be integrated within the second interface portion 10 of boot 1 only (as shown in FIG. 1-5), or the relief valve means may be integrated in the first interface portion 10 of boot 2 only (as shown in FIGS. 7+8). In alternative embodiment all interface portions 9,10 of a boot may include pressure relief valve means so that uncontrolled displacement (flipping) of the dust boot is effectively avoided.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A drum brake system comprising:
a housing for the brake cylinder defining a cylinder bore and at least two first interface seats having at least two first grooves thereon;
a first actuation member of a linear actuator disposed in the cylinder bore and moveable relative to the housing, wherein the linear actuator defines a second interface seat having a second groove thereon;
a second actuation member disposed in the cylinder bore and moveable relative to the housing, wherein the linear actuator defines a third interface seat having a third groove thereon wherein the second actuation member acts in an opposing direction from the first actuation member;
a compression spring member interposed axially between the first and second actuation members so that the first and second actuation members are flexibly spread apart from each other thus safeguarding the nominal hydraulic chamber volume when the brake system remains driveless under brake release condition, whereby the ends of the compression spring member are allocated in opposed blind bores of the first and second actuation members;
a first flexible dust boot for the first actuation member;
a second flexible dust boot for the second actuation member;
a first interface on each of the first and the second boots having an annular shape and which is attachable to the housing at a respective one of the at least first interface seats, and wherein the first interface is located radially outward from the at least two first interface seats;
a second interface on each of the first and second boots having an annular shape with a different diameter than the first interface, wherein the second interface is attachable to one of the first and the second actuation members at a respective one of the second and third interface seats, wherein the second interface is located radially outward from the second and the third interface seats respectively; and
flexible bellows of the on each of the first and the second boots connecting the first interface and the second interface, such that an internal chamber is at least partially formed when the first interface is secured to the housing and the second interface is mounted to one the of the first and second linear actuators respectively such that the first and the second boots protect against ingress of foreign substance in to a first and a second interior chamber while allowing for relative movement between the housing and the first and second linear actuators; and
at least one pressure relief valve on each of the first and second boots which is at least one flange proximate to at least one of the first interface and the second interface and facing one of the first interface seat and one of the second and third interface seats, wherein the at least one pressure relief valve is normally closed and automatically actuates to an open position when a pressure of the respective first and second interior chamber increases to a predetermined pressure differential than a pressure of an exterior pressure;
wherein the at least one pressure relief valve integrates relief valve spring elasticity in the respective first and second flexible boot, and wherein the first interface or the second interface of the boot integrates a relief valve body, and a part of the radially grooved counterpart first, second or third seat integrates a relief valve seat of the at least one relief valve and wherein the relief valve seat is the same surface as the radially grooved counterpart first, second or third seat;
wherein the pressure relief valve body integrates a separate recessed portion, and wherein the recessed portion is fluidly connected with the respective first and second interior chamber and separated from the exterior;
wherein the recessed portion is a longitudinal slot which is arranged in one of parallel and antiparallel with respect of the linear displacement direction of the respective first and second actuation member;
wherein the recessed portion is separated from the exterior via an end wall, and wherein the end wall is arranged orthogonally with respect to the linear displacement direction of the respective first and second actuation members.

2. The drum brake as recited in claim 1, wherein the internal chamber is fluidly sealed and hermetically closed to the exterior.

3. The drum brake as recited in claim 1, wherein the at least one pressure relief valve is in the normally closed position when pressure in the respective first and second interior chamber is equal to the exterior pressure.

4. The drum brake as recited in claim 1, wherein the at least one pressure relief valve is automatically self-actuated when the predetermined pressure differential is reached.

5. The drum brake as recited in claim 4, wherein the at least one relief valve is actuated in currentless manner.

6. The drum brake as recited in claim 1, wherein the end wall is provided with a predetermined resilience that corresponds with the predetermined pressure differential that actuates the at least one relief valve.

7. The drum brake as recited in claim 1, wherein the end wall has reduced wall thickness compared to an average wall thickness of the rest of the respective first and second boot.

8. The drum brake as recited in claim 1, wherein at least one of the first or second interface portion integrates multiple recessed portions.

9. The drum brake as recited in claim 8, wherein the multiple recessed portions are equidistant from one another and in circumferential direction in equal angle to each other neighboring recessed portion.

10. The drum brake as recited in claim 1, wherein at least one pressure relief valve is integrated only in the first interface portion, integrated only in the second interface portion, or alternatively integrated in the both interface portions of each boot.

11. The drum brake as recited in claim 1, wherein the pressure relief valve is integrated at least partly in both interface portions.

12. The drum brake as recited in claim 1, wherein the first interface portion of the boot is elastically snapped in the grooved counterpart first seat of an outer face of the housing, and the second interface portion of the boot is elastically snapped in grooved counterpart second or third seat that is arranged on an outer face of the actuating member.

13. The drum brake as recited in claim 1, wherein the pressure relief valve is normally hermetically closed.

* * * * *